United States Patent [19]

Chern

[11] 4,236,150

[45] Nov. 25, 1980

[54] LIQUID CRYSTAL DISPLAY SYSTEM

[75] Inventor: Mao-Jin Chern, Woodbury, Minn.

[73] Assignee: Minnesota Mining and Manufacturing Company, Saint Paul, Minn.

[21] Appl. No.: 952,322

[22] Filed: Oct. 18, 1978

[51] Int. Cl.³ .............................................. G09F 9/35
[52] U.S. Cl. ................................... 340/713; 340/765; 340/784; 340/812; 350/331 T
[58] Field of Search ............... 340/765, 784, 812, 713; 350/332, 333, 331 T

[56] References Cited

U.S. PATENT DOCUMENTS

| | | | |
|---|---|---|---|
| 3,907,405 | 9/1975 | Fukai et al. | 340/784 X |
| 3,921,162 | 11/1975 | Fukai et al. | 340/813 X |
| 4,031,529 | 6/1977 | Borel et al. | 340/713 |
| 4,045,791 | 8/1977 | Fukai et al. | 340/813 X |
| 4,048,628 | 9/1977 | Boswell | 340/713 X |
| 4,057,325 | 11/1977 | Kondo | 340/784 X |
| 4,066,333 | 1/1978 | Dargent et al. | |
| 4,100,540 | 7/1978 | Fujita et al. | 350/333 X |

OTHER PUBLICATIONS

Bak, Ko, and Labes; "Fast Decay in a Twisted Nematic Induced by Frequency Switching;" *Journal of Applied Physics*, vol. 46, No. 1, Jan. 1975, pp. 1–4.

Bucher, Klingbier and Van Meter; "Frequency-Addressed Liquid Crystal Field Effect;" *Applied Physics Letters*, vol. 25, No. 4, Aug. 1974, pp. 186–188.

Dargent and Robert; "Twisted Nematic Flat-Panel Display;" SID 77 Digest, pp. 60, 61.

Chang and Loebner; "Crossover Frequencies and Turn-Off Time Reduction Scheme For Twisted Nematic Liquid Crystal Displays;" App. Phys. Letters, vol. 25, No. 1. 1974 Jul., pp. 1, 2.

*Primary Examiner*—David L. Trafton
*Attorney, Agent, or Firm*—Cruzan Alexander; Donald M. Sell; Warren R. Bovee

[57] ABSTRACT

A liquid crystal display system having improved response time. The display system employs a refresh signal having a frequency which is controlled as a function of temperature to provide optimum decay time.

14 Claims, 4 Drawing Figures

LIQUID CRYSTAL DISPLAY SYSTEM

The present invention relates to a liquid crystal display system comprising a liquid crystal display cell and associated electronic means for causing portions of the liquid crystal in the cell to undergo rapid changes in optical state.

Certain useful liquid crystal display devices resemble, in construction, parallel-plate capacitors consisting of semitransparent electrodes containing therebetween a liquid crystal dielectric film generally 5 to 25 micrometers thick. The nematic liquid crystal materials used in these display devices are comprised of rod-like molecules capable of undergoing uniform alignment under the influence of an electromagnetic field. The uniform orientation of these rod-like molecules can be varied and controlled by the application of an electric field to provide optical effects useful in display devices. The ability to control the alignment of the liquid crystal molecules has been used to provide display devices of various types. For example, in the twisted nematic type of display, the walls of the display cell are treated, such as by rubbing or the like, to cause the molecules of liquid crystal to homogeneously align parallel to the linear direction of treatment of the wall material. The two liquid crystal display cell walls are then assembled such that the linear treatment of each of the cell walls is oriented perpendicular to the other. Introduction of a nematic liquid crystal into a display cell having walls to treated and oriented, causes the liquid crystal molecules adjacent each wall to be oriented parallel to the linear treatment on each wall, thus inducing a gradual ninety degree ∓twist" in the orientation of the liquid crystal molecules across the thickness of the cell from one wall to the other. Such a concept has been described by M. Schadt and W. Helfrich, in Applied Physics Letters, Volume 18, page 127 (1971), and is widely used.

By the appropriate use of optical polarizers, a twisted nematic layer can be made to appear opaque in the absence of an applied electric field. If the nematic liquid crystal material has a positive dielectric anisotropy, the application of a sufficiently strong electrical field normal to at least a portion of the nematic liquid crystal layer will cause the liquid crystal molecules to realign e.g. turn perpendicular to the cell wall, so that the area affected by the field will appear transparent. Upon removal of the electric field, the original twisted nematic orientation returns spontaneously due to the wall orientation effects and the liquid crystal layer again becomes opaque. Thus, by controlled application of the electric field, information can be visually displayed by the liquid crystal cell.

The ability of many liquid crystal materials to undergo uniform alignment under the influence of an electric field is not only dependent on the strength of the electric field but on the frequency of the electric field. It is known that liquid crystal materials exhibit dielectric anisotropy. That is, their dielectric constant when oriented parallel to an applied electric field will be different than when oriented perpendicular to the field. Such materials are classified as "positive" or "negative" according to whether the function $\Delta\epsilon > \epsilon_\| - \epsilon_\perp$ is positive or negative, wherein $\epsilon_\|$ is the dielectric constant of the liquid crystal with the geometric axis of the molecules aligned parallel to the field and $\epsilon_\perp$ in the perpendicular orientation.

As noted above, because the dielectric anisotropy is frequency dependent $\Delta\epsilon$ may change sign depending on the frequency at which $\Delta\epsilon$ is measured. The frequency at which $\Delta\epsilon$ changes sign, e.g. from positive to negative, is called the "crossover frequency" and can be readily determined for each liquid crystal composition by methods in the art.

Because the dielectric anisotropy is frequency dependent, it has been found that the application of an oscillating electric signal of sufficient voltage, having a frequency below the crossover frequency of the liquid crystal material, will cause the liquid crystal to orient in a characteristic direction. The application of an oscillating electric signal of sufficient voltage, having a frequency above the crossover frequency of the liquid crystal material, will cause the liquid crystal to orient in a different direction.

As used herein a liquid crystal will be considered a "positive" material if the frequency at which $\Delta\epsilon$ is positive is lower than the frequency at which $\Delta\epsilon$ is negative or if $\Delta\epsilon$ is positive at all frequencies. Conversely, a liquid crystal will be considered a "negative" material if the frequency at which $\Delta\epsilon$ is negative is lower than the frequency at which $\Delta\epsilon$ is positive or if $\Delta\epsilon$ is negative at all frequencies.

In order to provide useful liquid crystal display devices, it is desirable that the liquid crystal molecules respond rapidly to changes in the applied electric field. It has been observed that the liquid crystal molecules tend to respond rapidly when the applied electric field is changed from the "off" state (i.e., the state of zero or low, below threshold, voltage) to the "on" state (i.e., the state of high or above threshold voltage). As used herein, the terms "on" and "off" refer to the voltage state of the applied electric field and not to the resulting optical effect which may be observed in the display. In fact, a variety of optical effects can be produced by changing the electric field from "off" to "on" depending on the character of the liquid crystal and the construction of the display. Thus, with the applied electric field turned "on" the transmissivity of the affected portion of the display can be either high or low depending on the character of the liquid crystal and the construction of the display.

The time required for a typical liquid crystal to change from initial off-field orientation to the on-field orientation is often called the turn-on or rise time and is generally on the order of about 50 milliseconds at room temperature with an applied field of about three volts, RMS. The rise time will vary depending on the magnitude of the applied voltage, being generally shorter for higher applied voltages.

When the applied electric field is turned off, or reduced below the threshold level, the liquid crystal molecules will return to their initial off field orientation. For example, in a twisted field effect display the cells may return to their initial orientation parallel to the cell walls or in a dynamic scattering cell the molecules will return to the original quiescent state. The time for the molecules to return to their original state, or refresh themselves, is called the decay time and is generally quite long compared to the rise time, for example, on the order of 150 milliseconds at room temperature and several seconds or longer at lower temperatures. The length of this passive decay time is primarily governed by wall effects and the physical properties of the nematic liquid crystals, e.g. viscosity, elasticity, etc.

For many display applications, such as multiplex or other high speed or low temperature applications where more rapid updating of the display is required, it is desirable to reduce the decay time. However, only minor changes in the physical parameters of the liquid crystal materials appear to be practical, e.g. altering viscosity, varying the structures of the liquid crystals, introducing viscosity-lowering additives, etc. Thus, the art has searched for other means of achieving rapid decay rates.

Various investigators have described methods of accelerating the decay rate by forcing the liquid crystal molecules back to their initial orientation using an electric forcing field. See, for example, Bak et al, "Fast Decay in a Twisted Nematic Induced by Frequency, Switching" and of Applied Physics, Volume 46, Number 1, January 1975, page 1; Bucher et al, "Frequency-Addressed Liquid Crystal Field Effect". Applied Physics Letters, Volume 25, Number 4, Aug. 15, 1974, page 186; Dargeente et al, "Twisted Nematic Flat-Panel Display", and "Crossover Frequencies and Turn-Off Time Reduction Scheme for Twisted Nematic Liquid Crystal Displays". Applied Physics Letters, Volume 25, Number 1, July 1, 1974, page 1; and U.S. Pat. No. 4,066,333. These investigators have discovered that the application of an oscillating electric field having a frequency above the crossover frequency of the liquid crystal material results in shortened decay time.

The investigations described above have employed fixed-frequency decay-forcing signals. As will be appreciated from the description which follows, this mode of operation does not provide the maximum decay rate at all temperatures. Further, the random choice of a fixed frequency forcing signal may also necessitate the application of a forcing signal having an unnecessarily high voltage in order to achieve the desired decay rate at a given temperature. Such high voltages may be detrimental to the display system components, require more expensive components or exceed available driving voltages.

The present invention provides an improved liquid crystal display system wherein the decay rate of the display is increased beyond the natural decay rate by application of an oscillating refresh signal which has a frequency above the crossover frequency of the liquid crystal composition and which refresh signal frequency is a function of the temperature of the liquid crystal composition. One aspect of the present invention relates to a display system wherein the frequency of the refresh signal is controlled as a function of temperature to provide a decay time which is substantially the minimum decay time. As used herein, minimum decay time (or maximum decay rate) refers to the decay time achieved by applying a maximized refresh signal, i.e., a signal which (at a given temperature and voltage) will provide the fastest decay. Another aspect of the invention relates to a display system having an optimized refresh signal, i.e., a signal selected to have a frequency in the range which will provide a decay time at least 125%, and preferably at least 110%, of the minimum decay time achievable with a maximized refresh signal. As can be readily appreciated, the appropriate selection of refresh signal frequency allows the voltage of the refresh signal to be minimized to achieve a given decay time.

Yet another aspect of the invention relates to a liquid crystal display system wherein the liquid crystal composition comprises one or more phenyl cyclohexanes, optionally in combination with a pleochroic dye. This system provides superior response times at temperatures below 0° C., for example, down to −30° C.

The present invention provides liquid crystal display systems which can be effectively used at low temperatures where heretofore their slow decay rates may have limited their utility. Further, the present invention provides means for the preparation of multiplex drive displays having more rapid scanning rates under certain conditions, e.g. low temperatures, than previously possible.

For convenience herein, the electrical signals employed in the display systems of the present invention which have a frequency below the crossover frequency of the liquid crystal material, are referred to as the "information signals", whereas the electrical signals which have a frequency above the crossover frequency are referred to as the "refresh signals" or "forcing signals". This convention is being adopted herein with the understanding that the optical or visual effect produced by the information signals will vary, depending on the nature of the liquid crystal material and the construction of the display. Thus, in one case an information signal may cause the appearance of an informational pattern on the display while the forcing or refresh signal may cause the rapid disappearance of the informational pattern. In another case, the refresh signal may cause the appearance of the pattern, while the information signal has the effect of causing the pattern to disappear.

In accordance with the present invention, the frequency of the refresh signal is maintained in a selected temperature dependent frequency range above the crossover frequency of the liquid crystal composition in the cell. It has been found that the crossover frequency of the liquid crystal material varies with temperature. In addition, the present inventor has discovered that the relationship of decay time vs. refresh signal frequency, at a given temperature generally passes through a minimum point. Thus, for a given liquid crystal material, at a given temperature, a refresh signal frequency can be selected which will provide the fastest decay rate whereas other frequencies, although also above the crossover frequency, will provide a slower rate of decay. In addition, it can be seen that the decay rate slows rapidly as the refresh signal frequency moves from the optimum range. It is believed that this effect is due to the variation in dielectric anisotropy of the liquid crystal as a function of the frequency of the applied electric field.

As used in the present invention, the optimized frequency range is that range wherein the decay time is no more than 125% of the minimum decay time for a given temperature (assuming a given liquid crystal material and applied refresh voltage) and preferably is no more than 110% of the minimum decay time.

The present invention has proved particularly valuable in providing liquid crystal display systems having superior response times at relatively low temperatures, e.g. 0° C. down to −30° C. By designing systems according to the teachings of the present invention, refresh times of less than one second can be achieved at temperatures down to −30° C. whereas the natural decay time of the same liquid crystal material may exceed ten seconds.

While for ease of illustration the present invention may be described with particular reference to the use of positive nematic liquid crystals in field effect displays, it can be readily seen and it is contemplated that the invention includes the use of nematic liquid crystals and displays of other types.

The present invention can be further illustrated with reference to the drawings wherein.

Figure 1:
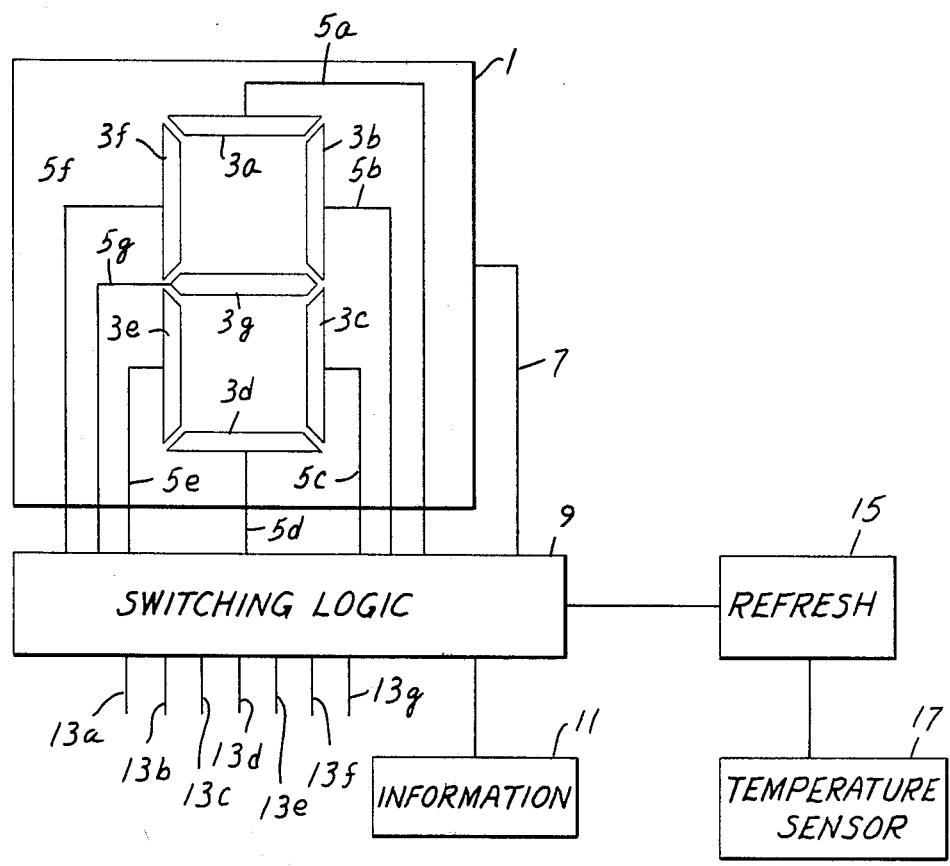
FIG. 1 is a schematic diagram of a liquid crystal display system employing a direct drive mode.

Referring now to FIG. 1, there is shown a conventional liquid crystal display cell 1 containing a typical seven-segment display area having transparent display segment electrodes 3a–g. The transparent common electrode on the rear wall of the display cell is not shown. The display segment electrodes are connected to switching logic 9 through associated connecting leads 5a–g while the common electrode is connected through lead 7. Information signal source 11 is connected to the display cell 1 through switching logic 9 having inputs 13a–g for addressing the desired segment(s) 3a–g.

"Refresh" signal source 15 is also connected to display cell 1 through switching logic 9. The frequency of the oscillating refresh signal from source 15 is varied, as described hereinafter, in response to input from temperature sensor 17.

The switching logic circuitry and the information signal source circuits are well known to skilled workers in the art, see for example U.S. Pat. No. 3,921,162 and 4,045,791. Similarly, the refresh signal source circuit is an oscillating signal source which can be readily provided and which is known in the literature.

In operation, the display of FIG. 1 is caused to respond to the change in the on/off state of inputs 13a–g. For example, in a field effect twist nematic display, if the numeral "7" were to be displayed, the inputs 13a–c would be switched to the "on" state to allow the voltage signal from information signal source 11 to be applied across electrode segments 3a–c of display cell 1 causing the molecules of liquid crystal adjacent these segments to realign and change their optical character so that these areas become visible. For example, the areas adjacent segments 3a–c may appear transparent relative to the opacity of the remainder of the display allowing a light from behind to show through the segments or allowing light from the front to be reflected back to the viewer through these segments.

When it is desired to change the displayed numeral from "7" to "1", it is necessary to cause electrode segment 3a to return to its optically "off" or opaque state. This is rapidly accomplished in the present invention by switching input 13a to the off state. In the recent invention, this causes segment electrode 3a to be affected only by the refresh signal from source 15 which quickly forces the molecules of liquid crystal adjacent segment electrode 3a back to their original alignment parallel to the cell walls (an opaque optical state). The frequency of the signal from refresh source 15 is controlled by temperature sensor 17 to provide the maximum or optimum decay rate for the operating temperature and signal voltage selected. The application of this controlled frequency refresh signal causes the realignment phenomena to occur much more rapidly than would naturally occur without the application of the refresh signal. This is particularly true at low temperatures etc., where viscosity effects tend to slow the natural molecular reorientation.

In practice, it is generally preferred that the refresh signal be applied to a segment only after the information signal to a particular segment is turned to the off state. This is generally accomplished by causing the refresh signal to be turned on for the desired segment at the instant the information signal to the segment is turned off. The refresh signal may be applied thereafter until the realignment of the liquid crystal molecules adjacent the segment has been completed and then discontinued or the signal may be continuously applied until the information signal to the segment is again turned on.

Alternatively, a refresh signal having a given voltage can be applied to all display segments continuously during operation of the display. When the liquid crystal material adjacent a particular segment must be changed to the alternate optical state, an information signal of higher voltage is applied effectively over-riding the refresh signal and causing reorientation of the liquid crystal adjacent the selected segment. When the information signal is discontinued, the continuous refresh signal again becomes dominant at that segment and aids in forcing the liquid crystal material back to its original orientation.

In either method described above, the refresh signal is present for at least some period following the cessation of the information signal at a given segment.

As noted hereinabove, the frequency of the oscillating refresh signal is a function of the temperature of the liquid crystal material in display cell 1. Temperature sensor 17 is constructed to monitor temperature and provide an input to refresh signal source 15 corresponding to the monitored temperature. Temperature sensor 17 can be conductively, electrically or otherwise coupled to the display cell 1 to monitor the temperature of the liquid crystal material therein or the temperature of the cell wall if it corresponds rather closely with the liquid crystal temperature. Alternatively, temperature sensor 17 can be constructed and located to measure the ambient temperature or other temperature which can be related to the liquid crystal temperature.

The output of temperature sensor 17 controls the frequency of the refresh signal from source 15. The frequency of the refresh signal may be continuously variable with the output of temperature sensor 17 or may be selected to step to selected frequencies as the output of sensor 17 varies. The particular function chosen, i.e. continuous or step, will depend on such factors as the circuit complexity, the decay rate required, the decay rate vs. frequency characteristics of the liquid crystal material, etc., as will be described hereinafter.

Figure 2:
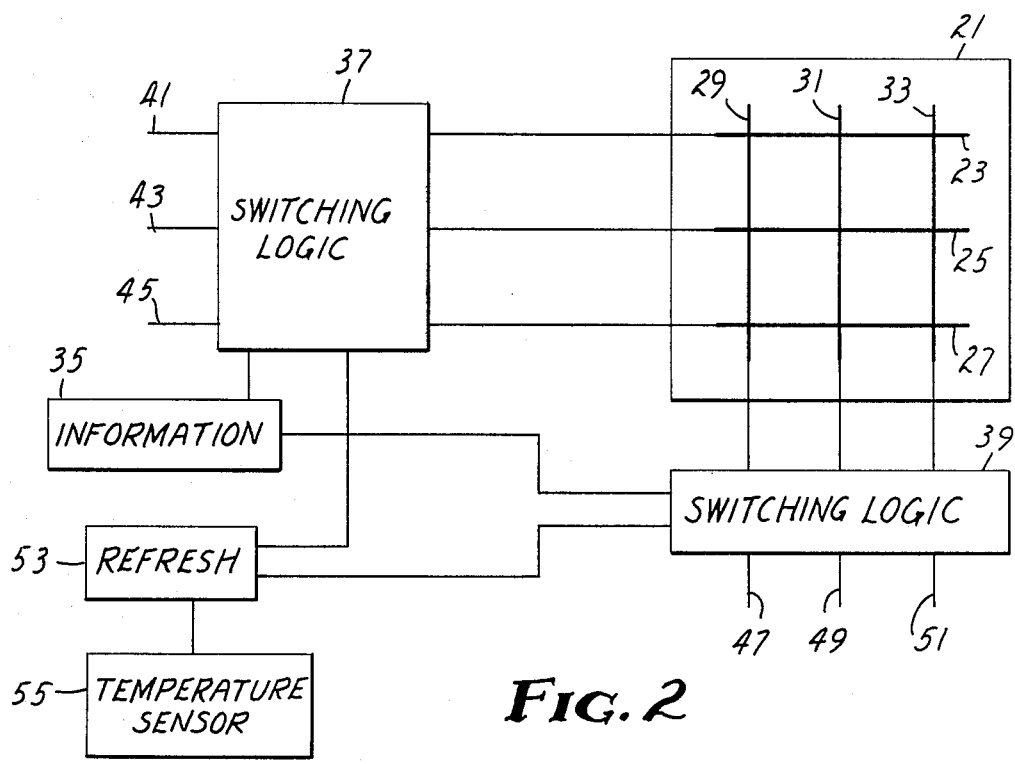
FIG. 2 is a schematic diagram of a liquid crystal display system employing a multiplex drive mode.

FIG. 2 shows a simplified schematic of a multiplex drive system comprising a conventional dot matrix liquid crystal display cell 21. This type of cell 21 typically comprises a plurality of transparent elongated X-matrix electrodes 23, 25 and 27 extending parallel to each other on the interior of one of the display cell walls and a plurality of transparent Y-matrix electrodes 29, 31 and 33 extending parallel to each other, and generally orthoganal to the X-matrix electrodes. The liquid crystal material (not shown) is contained in the cell as a thin layer between the cell walls. Information signal source 35 is connected to display 21 through X-matrix switching logic 37 and Y-matrix switching logic 39. The X- matrix switching logic 37 having inputs 41, 43 and 45 as shown and Y-matrix switching logic 39 having inputs 47, 49 and 51. While the representative illustration in FIG. 2 shows only 3 pairs of orthoganal electrodes, in practice, many more pairs of electrodes would be required to present complex forms of information. However, the principles described herein would be the same for the more complex displays.

Refresh signal source 53 is connected to display 21 through X-matrix switching logic 37 and Y-matrix switching logic 39. The frequency of the oscillating signal from refresh source 53 is varied as described hereinafter in response to the input from temperature sensor 55.

As with the system described with respect to FIG. 1, the multiplex drive system shown in FIG. 2 operates by the application of an information signal at points corresponding to crossing or common electrode points. For example, in a twist nematic field effect display, if inputs 41 and 47 are switched to the on state, the liquid crystal in the area between electrodes 23 and 29 will be optically realigned so that a dot is displayed. The scanning circuitry incorporated in switching logic circuits 37 and 39 permits sequential scanning of both X and Y electrodes in a repetitive manner to provide an information signal at each electrode cross-point independently and at a maximum speed dictated by the refresh or decay time of the liquid crystal material. The scanning pattern may be modulated to superimpose a pattern-forming sequence of voltage pulses for providing a constant or changing pattern such as a still or motion picture or a sequence of numerals, letters, etc. in dot-matrix form. These techniques are known in the art as exemplified by U.S. Pat. No. 3,844,650 issued Oct. 29, 1974.

Similarly, the refresh signal may be applied continuously as discussed above or may be sequentially applied to selected electrode pairs following the cessation of an information signal to force the liquid crystal material to return to its original orientation.

Since the speed at which the voltage pulses can be usefully applied to the electrodes is limited by the time required for the liquid crystal to refresh itself, the present invention provides a display system in which the liquid crystal material can be refreshed more rapidly than in prior systems and therefore updated with information more quickly than prior systems.

The components of the display system of the present invention are known to skilled workers in the art. The liquid crystal display cell commonly comprises two closely spaced transparent panels containing therebetween a composition comprising a nematic liquid crystal material. The transparent panels contain opposed electrodes on the inner surface thereof arranged to allow the application of an electric field across the liquid crystal material in selected areas to provide for information display. For example, in FIG. 1 the electrodes are arranged to provide a common seven-segment display whereas in FIG. 2 an X-Y grid is formed.

The composition contained in the cell can comprise any of the nematic liquid crystal compositions known in the art which exhibit the crossover frequency phenomenon discussed hereinbefore. Generally, it is preferred that the materials exhibit a positive dielectric anisotropy at frequencies below the crossover frequency. Single compounds and mixtures may be employed and they may be used alone or in combination with other materials, such as pleochroic dyes, to provide the desired optical effect.

Exemplary of the liquid crystal compounds which may be used in the practice of this invention are the phenylcyclohexanes, biphenylcyclohexanes, cyanobiphenyls, schiff bases such as MBBA, EBBA, BBBA and PBBA, azoxy compounds and aromatic esters which are well known in the art.

A particularly preferred class of liquid crystal compounds for use in the present invention are the positive nematic phenylcyclohexanes represented by the structural formula:

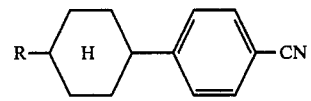

and the biphenyl cyclohexanes represented by the structural formula:

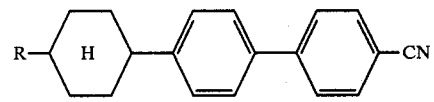

wherein R is an alkyl radical having 3 to 7 carbon atoms. Mixtures of these compounds are also useful as well as compositions including one or more of these compounds in amounts which provide a net positive dielectric anisotropy.

In addition, the above compounds can be combined with one or more pleochroic dyes which impart color to the liquid crystal compositions. Representative pleochroic dyes which may be used in the present invention, are the azo dyes, methine 4-nitro-arylidene dyes having certain substituents in the 2 position of the arylidene group, the anthroquinone dyes and others which are well known to skilled workers in the art.

Exemplary of the display systems of the present invention is a system wherein the liquid crystal display contains a commercially available liquid crystal mixture of three phenylcyclohexanes and one biphenylcyclohexane (available commercially under the trade designation Nematic Phase 1132 TNC "Licristal" from E. M. Laboratories, Inc.) alone or in combination with the aforementioned pleochroic dyes. The crossover frequency and the decay time as a function of frequency of the refresh signal and temperature of the liquid crystal material can be readily obtained. A plot of decay time vs. refresh signal frequency for several temperature values is shown in FIG. 3.

Figure 3:
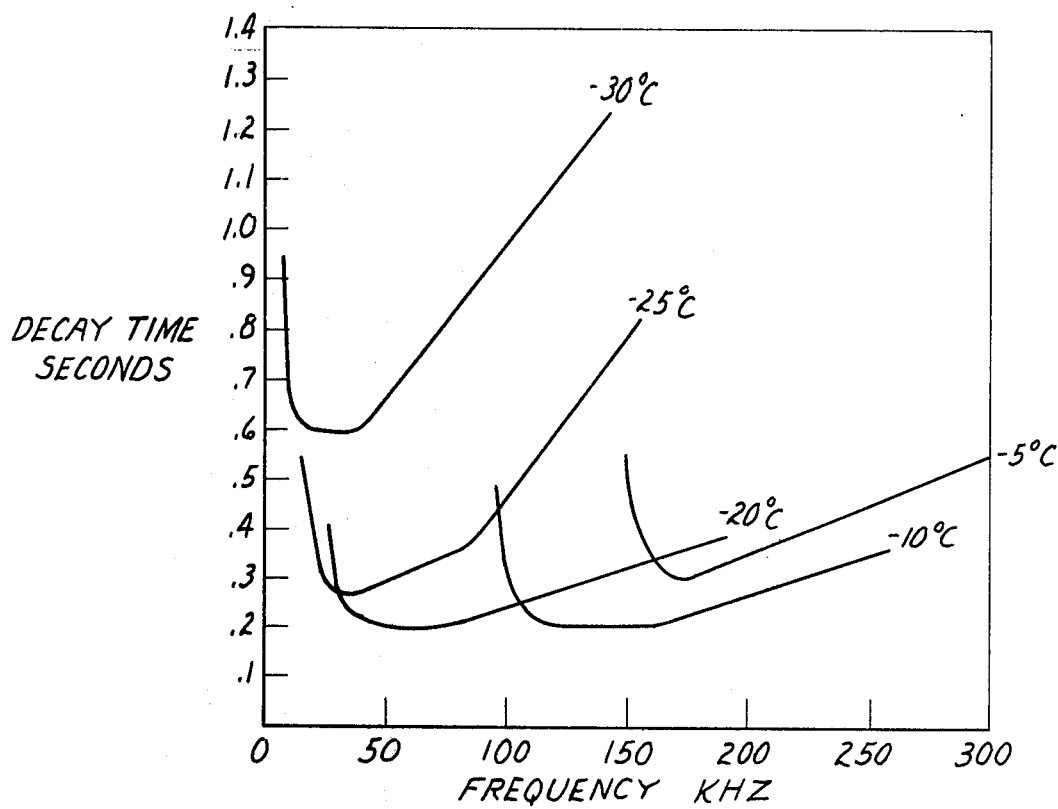
FIG. 3 is a graph showing the decay time vs. frequency of the refresh signal for a particular liquid crystal system.

As can be seen from the graph in FIG. 3 the decay time is a minimum within certain frequency ranges. By selecting an optimum frequency range for each operating temperature i.e. a frequency which provides a decay time within 125% and preferably 110% of the minimum forced decay time at the given temperature, a display system having a rapid decay time, e.g. less than 1 second at temperatures below 0° C., can be provided. At temperatures above 0° C. the natural decay rate may be sufficiently rapid that the use of the refresh signal may not be necessary for many applications.

Figure 4:
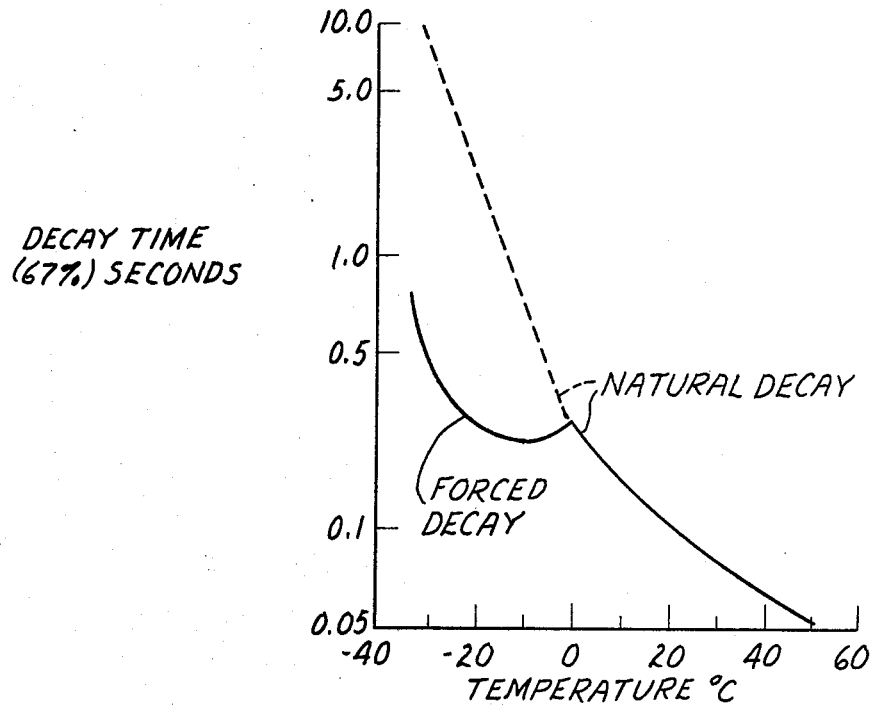
FIG. 4 is a graph showing the decay time vs. temperature for a liquid crystal display system according to the present invention compared to a system employing a natural decay rate.

FIG. 4 shows a representative log plot of decay time versus temperature which would be expected for the display system described above. The decay times plotted represent the time which would be required to achieve 67% of final alignment of the liquid crystal as measured by light reflected from the display. FIG. 4 shows that the natural decay time (67%) would be about 1 second at −10° C. Using a refresh signal of 100 KHz and 25 volts, the decay time at −10° C. would be reduced to about 300 milliseconds. At −30° C. the natural decay rate of the system represented in FIG. 4 would be about 6 seconds, whereas the use of the refresh signal (20 KHz, 25 volts) would reduce the decay time to about 600 milliseconds. Thus, FIG. 4 graphically demonstrates the improvement in refresh time which can be achieved by the display system of the present invention.

As can be seen from FIG. 3, the optimum frequency range for the temperatures −5° C. to −30° C. varies rather widely, but the ranges for each temperature from −30° C. to −20° C. all overlap one another. Thus, in this instance, a single "optimum" refresh signal frequency of about 40–50 KHz may be used over the temperature range −30° C. to −20° C. and still provide a decay time within 125% of the minimum time for each temperature. Similarly, a single refresh signal optimum frequency may cover the range of −10° C. to −5° C., e.g. about 175 KHz. Thus, it can be seen that the refresh signal frequency need not be continuously variable, but may be a step function of the temperature.

As has been noted herein, the liquid crystal materials vary in terms of their dielectric properties and such properties will dictate the characteristics of the refresh signal employed. For example, the properties of a liquid crystal composition comprising a mixture of aromatic esters (available commercially under the trade designation Nematic Phase 1085 TNC "Licristal" from E. M. Laboratories, Inc.) are as shown in Table 1 below:

TABLE 1

| Temp. °C. | Crossover Freq., KHz | Optimum Refresh Freq. Range, KHz at 20 Volts |
|---|---|---|
| −10 | 0.03 | 0.15–50 |
| −5 | 0.06 | 0.3–50 |
| 0 | 0.2 | 0.5–50 |
| 5 | 0.3 | 1.5–50 |
| 10 | 0.6 | 1.5–60 |
| 20 | 1.8 | 6–60 |
| 40 | 15 | 30–100 |

When these materials are employed in the liquid crystal display systems of the present invention, decay rates of less than 0.5 seconds at −5° C. can be obtained. Furthermore, with the liquid crystal material having the properties shown in Table 1 above, a single refresh signal frequency of between 30 and 50 KHz at 20 volts can provide decay times within 125% of the minimum over a rather broad temperature range, e.g. −5° C. to 40° C.

What is claimed is:

1. A field effect liquid crystal display system comprising a liquid crystal display cell containing a positive nematic liquid crystal material having a characteristic crossover frequency said display cell having one or more pairs of electrodes addressable by an associated electronic control means for applying information signals thereto, wherein the improvement comprises a temperature sensing electronic control means for selectively providing a refresh signal to each of said electrode pairs, said refresh signal being an oscillating voltage signal wherein the frequency of said signal is controlled as a function of the temperature of said liquid crystal material and is always greater than the crossover frequency of said liquid crystal material.

2. A display system according to claim 1 wherein the frequency of said refresh signal is selected to provide the minimum forced decay time at said temperature and voltage.

3. A display system according to claim 1 wherein the frequency of said refresh signal is an optimum frequency selected to provide a forced decay time which is at least 125% of the minimum forced time at said temperature and voltage.

4. A display system according to claim 1 wherein the frequency of said refresh signal is an optimum frequency selected to provide a forced decay time which is at least 110% of the minimum forced decay time at said temperature and voltage.

5. A display system according to claim 1 wherein said refresh signal frequency is continuously variable with respect to said temperature.

6. A display system according to claim 1 wherein said refresh signal frequency is a step function with respect to said temperature.

7. A display system according to claim 1 wherein said refresh signal is applied only at temperatures below those at which the natural decay time of the liquid crystal material exceeds 500 milliseconds.

8. A display system according to claim 1 wherein said refresh signal is applied only at temperatures below 0° C.

9. A display system according to claim 1 wherein said liquid crystal material comprises a liquid crystal compound selected from the group consisting of phenylcyclohexanes, biphenylcyclohexanes and mixtures thereof.

10. A display system according to claim 9 wherein said liquid crystal material is in combination with one or more pleochroic dye.

11. A method of controlling a field effect liquid crystal display comprising a nematic liquid crystal having a positive characteristic crossover frequency comprising the steps of
   (a) applying an information signal to at least one of the electrode pairs of said display,
   (b) causing said liquid crystal to decay to the molecular state characteristic of the display when no information signal is applied thereto,
wherein the improvement comprises forcing the liquid crystal molecules to decay to their initial state by the application of an oscillating refresh signal having a frequency which is variably controlled as a function of the temperature of the liquid crystal material and is always greater than the crossover frequency of said liquid crystal material.

12. A method according to claim 11 wherein the frequency of the refresh signal is controlled in an optimum range to provide a forced decay time within 125% of the minimum forced decay time for said liquid crystal at the given temperature and voltage.

13. A method according to claim 11 wherein the frequency of said refresh signal is continuously varied with respect to said temperature.

14. A method according to claim 11 wherein the refresh signal is applied only at temperatures below 0° C.

* * * * *

UNITED STATES PATENT AND TRADEMARK OFFICE
CERTIFICATE OF CORRECTION

PATENT NO. : 4,236,150
DATED : November 25, 1980
INVENTOR(S) : Mao-Jin Chern

It is certified that error appears in the above-identified patent and that said Letters Patent are hereby corrected as shown below:

Column 1, line 30; following "walls", "to" should

Column 3, line 21; following "Display," add -- SID '77 Digest (1977) page 60; Chang et al, --.

Column 10, line 39 (Claim 11, line 2): following "comprising a" insert -- positive -- , and line 40 (Claim 11, line 3); delete "positive".

Signed and Sealed this

Second Day of June 1981

[SEAL]

Attest:

RENE D. TEGTMEYER

Attesting Officer

Acting Commissioner of Patents and Trademarks